Patented Apr. 10, 1945

2,373,583

UNITED STATES PATENT OFFICE 2,373,583

CONVERSION OF METHYL FORMATE TO FORMIC ACID

Donald John Loder, Wilmington, Del., assignor to E. I. du Pont de Nemours & Company, Wilmington, Del., a corporation of Delaware No Drawing. Application October 15, 1942,
Serial No. 462,180

9 Claims. (Cl. 260—542)

This invention relates in general to organic chemical reactions, and particularly relates to a process for the conversion of an organic ester into the organic acid and alcohol from which it is derived.

Heretofore, organic esters were converted into the acids and alcohols from which they are derived by admixing them with water and an esterification catalyst, and subjecting the esters to hydrolysis, whereby the organic acids and alcohols forming the esters were regenerated. Many esters cannot be treated according to this method, since the organic acids and alcohols are in many cases difficult to separate from the water employed in the hydrolysis. This is especially true in the case of formic esters, since formic acid is not readily separable from water. Likewise, the initial ester employed is often azeotropic with the alcohol or other of the liberated products, and also with water.

It is an object of this invention to provide a process for preparing anhydrous formic acid from formic esters. A still further object is to convert methyl formate into methanol and formic acid by a simple and expeditious process. Other objects will be apparent hereinafter.

These objects are accomplished by this invention wherein methyl formate is converted into the organic acid and alcohol from which it is derived, by subjecting the said ester to acidolysis at an elevated temperature below that at which substantial cracking takes place, with a dicarboxylic organic acid, recovering formic acid from the reaction mixture, hydrolyzing the formed dicarboxylic acid ester to liberate methanol and the dicarboxylic organic acid, and returning the recovered dicarboxylic acid to reaction.

In one preferred embodiment, the invention comprises subjecting methyl formate to reaction with glutaric acid while admixed with an esterification catalyst, whereby anhydrous formic acid is liberated, thereafter subjecting the formed methyl esters of glutaric acid to a controlled hydrolysis with water to liberate methanol, and recovering the regenerated glutaric acid. This invention also provides a method for preparing half esters of dicarboxylic acids such as, for example, the monomethyl ester of adipic acid, through the reaction of methyl formate with the dicarboxylic acid. It has been found that when the foregoing reaction is carried out, a very high yield of the mono-ester results. This is a novel and unexpected advantage, since in the reaction of a dicarboxylic acid with an alcohol, the dialkyl esters frequently predominate.

The following examples, in which parts are by weight unless otherwise designated, illustrate the practice of the invention, without however, limiting it thereto:

*Example 1.*—51.1 lbs. of glutaric acid, 48.7 lbs. of methyl formate, and 0.2 lb. of sulfuric acid are charged into a reaction vessel provided with heating and cooling means, a reflux condenser and an ordinary condenser; the still is placed under total reflux, and the reaction mixture is refluxed by heating for approximately two hours. At the end of this time, the still contains 12.5 lbs. of formic acid, 33.2 lbs. glutaric acid, 21.7 lbs. glutaric esters, 32.4 lbs. methyl formate, and 0.2 lb. sulfuric acid. Three-tenths lb. of sodium formate is then added to neutralize the sulfuric acid catalyst and arrest further reaction. The mixture is subjected to distillation, whereby 32.4 lbs. of methyl formate are first recovered, and thereafter 12.7 lbs. formic acid, including 0.2 lb. formic acid from the sodium formate added to neutralize the catalyst. There remains in the still 33.2 lbs. glutaric acid, 21.7 lbs. glutaric esters, and 0.3 lb. sodium sulfate. An additional 0.2 lb. sulfuric acid is then added, together with 14.6 lbs. of water. Heating is continued, maintaining the still head at a temperature of about 66° C., that is, about the boiling point of methanol. Methanol from the hydrolyzing glutaric esters is continuously distilled off from the column. After the last methanol is removed, the still head temperature is allowed to rise to the boiling point of water, and residual water is distilled from the column. At this stage of the reaction, 8.7 lbs. of methanol have been removed and 9.8 lbs. of water. There remains in the still pot approximately 51.1 lbs. glutaric acid, 0.3 lb. sodium sulfate and 0.2 lb. sulfuric acid. Thereupon, an additional 48.7 lbs. of methyl formate may be charged into the still and the cycle repeated. Approximately 0.3 lb. of sodium sulfate must be removed per cycle from the reaction mixture. As a practical matter, however, this may be allowed to build up to a considerably higher value, and then may be separated from the glutaric acid remaining at the end of the cycle by known means, such as crystallization.

*Example 2.*—Into a still provided with heating and cooling means, a fractionating column, and means for placing the still on total reflux operation, is charged 854 parts methyladipic acid, 705 parts methyl formate, and 1.8 parts sulfuric acid. The reaction mixture is heated to the boiling temperature of the reaction mixture, while operating under total reflux for 12.5 hours, to attain equilibrium. The apparatus is cooled to room temperature, and 2.75 parts sodium formate is added to neutralize the sulfuric acid catalyst. The resulting equilibration mixture is fractionally distilled, yielding unconverted methyl formate and 149 parts anhydrous formic acid, (a conversion of 30.5%, allowing for the formic acid resulting from sodium formate addition). The residual liquid, comprising a mixture of the mono- and di-esters of methyladipic acid, amounted to 895 parts. To the 895 parts mixed esters of methyladipic acid above formed, 6.5 parts concentrated sulfuric acid and 90 parts water are added, and the reaction mixture is refluxed at reduced pressure (about 20 mm.), in a still equipped with means for maintaining a vacuum therein, heating means, a reflux condenser, and a cold-trap provided with low-cooling means for condensing vapors drawn through the reflux condenser. During the refluxing, 90 parts of liberated methanol from hydrolysis is condensed in the cold-trap, and 899 parts recovered aqueous methyladipic acid remain as a residue, together with 6.5 parts sulfuric acid catalyst. After concentration, the methyl adipic acid can be again equilibrated with further quantities of methyl formate.

*Example 3.*—Into a silver lined shaker tube provided with means for heating and cooling as well as means for agitation thereof, is charged 360 parts methyl formate, 418 parts adipic acid, and 10 parts concentrated sulfuric acid catalyst. The shaker tube is closed, agitation is begun, and thereafter the temperature is raised to 70–146° C. The temperature is maintained within this range for 15 hours, during which time the autogenous pressure rises to 7000 lbs./sq. inch. After 15 hours, the shaker tube is cooled, the pressure is let down, and the equilibration mixture is filtered. Sodium formate sufficient to neutralize the sulfuric acid catalyst is then added to the filtrate, which is placed in a distilling vessel and fractionally distilled first at atmospheric pressure, and then under vacuum. The distillate yields 59.4 parts unreacted methyl formate, 25.6 parts formic acid, 46.7 parts dimethyl adipate boiling at about 91° C./3 mm. and 89.2 parts monomethyl ester of adipic acid, boiling at 122° C./1 mm., a small amount of residue equalling 20 parts remaining in the still pot. This residue is principally unreacted adipic acid.

The mono- and di-methyl esters of adipic acid secured above are placed in a still with about 1% concentrated sulfuric acid and about the equivalent quantity of water, and hydrolyzed as in the preceding examples, to yield methanol and regenerated adipic acid. Alternatively, since they are valuable in the arts, the adipic esters are retained as such.

As shown by the foregoing examples, the methyl formate is converted into the organic acid and alcohol from which it is derived. Any organic dicarboxylic acid may be used for the initial acidolysis step. For example, a dicarboxylic acid such as oxalic, glutaric, adipic, diglycolic, or other dicarboxylic acid is utilized to produce the intermediate ester, and to liberate the formic acid derived from the initial ester being treated.

The invention may be practiced at atmospheric, elevated, or reduced atmospheric pressures, but it has been found that atmospheric pressure is satisfactory in general. The invention is carried out under liquid phase conditions for the acidolysis and hydrolysis steps. Therefore, in carrying out the invention at elevated temperatures, a pressure sufficient to maintain the reactants in the liquid phase is preferably employed. It has been found that heating the reaction mixtures to boiling at atmospheric pressure in equipment provided with a reflux condenser is, in general, preferable.

The temperature at which the acidolysis and hydrolysis steps are carried out is an elevated temperature below that at which substantial cracking of the reactants takes place. In general, the boiling temperatures of the reaction mixtures under atmospheric pressure are preferred. The acidolysis step can be carried out at a temperature of 25–150° C. and the hydrolysis step can also be carried out at 25–150° C.

The usual esterification catalysts are employed in carrying out the acidolysis step and can also be used in the hydrolysis step, in the practice of the present invention. Suitable catalysts include sulfuric acid, phosphoric acid, hydrochloric acid, and other strong inorganic acids, as well as such known esterification catalysts as boron fluoride, and its addition compounds with water and the like, benzene sulfonic acid, acid salts of inorganic acids, and other usual esterification catalysts.

Instead of batch operation, the reaction may be carried out in a continuous countercurrent column, if desired. The methyl formate is introduced at a point near the base of the column while the temperature of the reaction column is maintained above the boiling point of formic acid but below the boiling point of the dicarboxylic acid esters formed. Esterification catalyst together with dicarboxylic acid is introduced into the column and the liberated formic acid with some unreacted methyl formate is continuously withdrawn from a point near the head of the column, while the formed dicarboxylic esters together with unreacted dicarboxylic acid are continuously withdrawn at a point near the base of the column. The dicarboxylic ester is thereafter forwarded to a hydrolysis column, where it is continuously hydrolyzed. The liberated methanol is continuously withdrawn at the head of the hydrolysis column, and recovered dicarboxylic acid is continuously withdrawn at the base thereof.

Various changes may be made in the details and practice of the invention without departing from the spirit and scope thereof.

I claim:

1. A process for the conversion of methyl formate to formic acid and methanol which comprises subjecting methyl formate to acidolysis with an organic dicarboxylic acid in the presence of an inorganic acid catalyst, distilling the liberated formic acid from the reaction mixture, hydrolyzing the formed dicarboxylic esters to methanol and dicarboxylic acid, and returning such organic dicarboxylic acid to the acidolysis.

2. A process for the conversion of methyl formate to formic acid and methanol which comprises subjecting methyl formate to acidolysis with adipic acid in the presence of an inorganic acid catalyst, distilling the liberated formic acid from the reaction mixture, hydrolyzing the adipic esters to methanol and adipic acid, and returning such adipic acid to the acidolysis.

3. A process for the conversion of methyl formate to formic acid and methanol which comprises subjecting methyl formate to acidolysis with methyladipic acid in the presence of an inorganic acid catalyst, distilling the liberated formic acid from the reaction mixture, hydrolyzing the formed methyladipic esters to methanol and methyladipic acid, and returning such methyladipic acid to the acidolysis.

4. A process for the conversion of methyl formate to formic acid and methanol which comprises subjecting methyl formate to acidolysis with glutaric acid in the presence of an inorganic acid catalyst, distilling the liberated formic acid from the reaction mixture, hydrolyzing the formed glutaric esters to methanol and glutaric acid, and returning such glutaric acid to the acidolysis.

5. A process for the conversion of methyl formate to formic acid and methanol which comprises subjecting methyl formate to acidolysis at a temperature of 25° to 125° C. with an organic dicarboxylic acid in the presence of an inorganic acid catalyst, distilling the liberated formic acid from the reaction mixture, hydrolyzing the formed dicarboxylic acid esters at a temperature of 25° to 150° C. to methanol and organic dicarboxylic acid, and returning such organic dicarboxylic acid to the ester hydrolysis.

6. The process which comprises continuously passing methyl formate and organic dicarboxylic acid into a reaction zone at a temperature of 25° to 150° C. in the presence of an inorganic acid esterification catalyst, continuously withdrawing unreacted acid and recovered methyl formate as vapors from the reaction zone, and dicarboxylic acid methyl esters in liquid form from the reaction zone, continuously hydrolyzing the organic dicarboxylic acid methyl esters at a temperature of 25° to 150° C. to yield methanol and organic dicarboxylic acid, and continuously returning such dicarboxylic acid to the reaction zone.

7. The process which comprises continuously passing methyl formate and glutaric acid into a reaction zone at a temperature of 25° to 150° C. in the presence of sulfuric acid catalyst, continuously withdrawing formic acid and unreacted methyl formate as vapors from the reaction zone, and glutaric acid methyl esters in liquid form from the reaction zone, continuously hydrolyzing the glutaric acid methyl esters at a temperature of 25° to 150° C. to yield methanol and glutaric acid, and continuously returning such glutaric acid to the reaction zone.

8. A process for the conversion of methyl formate to formic acid and methanol which comprises subjecting 48.7 lbs. methyl formate to acidolysis to 51.1 lbs. of glutaric acid in the presence of about 0.2 lb. of sulfuric acid, boiling the reaction mixture under reflux conditions for about two hours, distilling about 12.5 lbs. liberated formic acid from the reaction mixture, hydrolyzing the formed glutaric esters to produce glutaric acid and continuously returning such glutaric acid to the acidolysis.

9. In a process for the conversion of methyl formate to methanol and formic acid the step which comprises heating methyl formate with glutaric acid in the presence of a strong inorganic acid catalyst at a temperature in the range of about 25° to 150° C., whereby a reaction mixture consisting chiefly of monomethyl glutarate, formic acid and glutaric acid is produced.

DONALD JOHN LODER.